US012756839B2

(12) United States Patent
Zheng et al.

(10) Patent No.: US 12,756,839 B2
(45) Date of Patent: Oct. 6, 2026

(54) VIDEO CODEC BUFFER QUANTITY REDUCTION

(71) Applicant: Apple Inc., Cupertino, CA (US)

(72) Inventors: Yunfei Zheng, Santa Clara, CA (US); Alexandros Tourapis, Los Gatos, CA (US); Alican Nalci, La Jolla, CA (US); Felix C. Fernandes, Saratoga, CA (US); Hilmi Enes Egilmez, Santa Clara, CA (US); Hsi-Jung Wu, San Jose, CA (US); Jaehong Chon, Cupertino, CA (US); Jun Xin, San Jose, CA (US); Yeqing Wu, Cupertino, CA (US); Yixin Du, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 27 days.

(21) Appl. No.: 18/784,149

(22) Filed: Jul. 25, 2024

(65) Prior Publication Data

US 2024/0388720 A1 Nov. 21, 2024

Related U.S. Application Data

(63) Continuation-in-part of application No. PCT/US2023/011851, filed on Jan. 30, 2023.
(Continued)

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/172* (2014.11); *H04N 19/43* (2014.11); *H04N 19/58* (2014.11)

(58) Field of Classification Search
CPC .. H04N 19/159; H04N 19/105; H04N 19/172; H04N 19/43; H04N 19/58; H04N 19/176; H04N 19/423
See application file for complete search history.

(56) References Cited

U.S. PATENT DOCUMENTS 6,842,483 B1 1/2005 Au et al.
8,634,469 B2 1/2014 Lu et al.
(Continued)

FOREIGN PATENT DOCUMENTS

WO WO-2023287418 A1 * 1/2023 ........... H04N 19/176

OTHER PUBLICATIONS

Balota et al., "Overview and Quality Analysis in 3D-HEVC Emergent Video Coding Standard," 2014 IEEE 5th Latin American Symposium on Circuits and Systems, Santiago, Chile, Feb. 25-28, 2014, 4 pages.
(Continued)

*Primary Examiner* — Richard A Hansell, Jr.
(74) *Attorney, Agent, or Firm* — Fish & Richardson P.C.

(57) ABSTRACT

Methods, systems, and apparatus, including computer programs encoded on computer storage media, for reducing a quantity of buffers for a video codec. One of the methods includes determining, from a plurality of prediction modes, a prediction mode for data that represents frame data in a frame; in response to determining the prediction mode, selecting, using the prediction mode, one or more buffers from a plurality of buffers, each buffer of which is for a prediction mode from the plurality of prediction modes, a first quantity of buffers in the plurality of buffers being less than a second quantity of prediction modes in the plurality of prediction modes; retrieving, from each of the one or more buffers, historical data for the frame data; and in response to retrieving the historical data, generating, using
(Continued)

the historical data, updated data for the frame data in the frame of the video sequence.

20 Claims, 4 Drawing Sheets

Related U.S. Application Data

(60) Provisional application No. 63/663,905, filed on Jun. 25, 2024, provisional application No. 63/305,590, filed on Feb. 1, 2022.

(51) Int. Cl.

*H04N 19/172* (2014.01)
*H04N 19/43* (2014.01)
*H04N 19/58* (2014.01)

(56) References Cited

U.S. PATENT DOCUMENTS

| | | | | |
|---|---|---|---|---|
| 8,913,660 | B2 | 12/2014 | Tourapis et al. | |
| 9,215,475 | B2 | 12/2015 | Tourapis et al. | |
| 9,674,548 | B2 | 6/2017 | Tourapis et al. | |
| 11,863,784 | B2 * | 1/2024 | Zhang | H04N 19/513 |
| 2013/0022119 | A1 * | 1/2013 | Chien | H04N 19/147<br>375/E7.123 |
| 2018/0270502 | A1 * | 9/2018 | Mukherjee | H04N 19/513 |
| 2020/0112741 | A1 * | 4/2020 | Han | H04N 19/513 |
| 2021/0218957 | A1 * | 7/2021 | Jang | H04N 19/52 |
| 2021/0274163 | A1 * | 9/2021 | Li | H04N 19/105 |
| 2025/0254333 | A1 * | 8/2025 | Bordes | H04N 19/159 |

OTHER PUBLICATIONS

Chen et al., "An Overview of Core Coding Tools in the AV1 Video Codec," 2018 Picture Coding Symposium (PCS), San Francisco, CA, USA, Jun. 24-27, 2018, 5 pages.

gitlab.com [online], "AVM research-v7.0.1," May 2024, retrieved Jun. 24, 2024, retrieved from URL <https://gitlab.com/AOMediaCodec/avm/-/tree/research-v7.0.1>, 6 pages.

Han et al., "A Technical Overview of AV1," CoRR, Submitted on Feb. 8, 2021, arXiv:2008.06091v2, 25 pages.

Mukherjee et al., "Reference Motion Vector Candidate Bank," Sep. 14, 2021, CWG-B023_v2, Alliance for Open Media, Codec Working Group, 7 pages.

Sjoberg et al., "Overview of HVEC high-level syntax and reference picture management," IEEE Transactions on Circuits and Systems for Video Technology, Oct. 5, 2012, 22(12):1858-1870, 14 pages.

Tourapis et al., "Fast motion estimation within the H.264 codec," 2003 International Conference on Multimedia and Expo. ICME '03. Proceedings (Cat. No. 03TH8698), Baltimore, MD, USA, Jul. 6-9, 2003, pp. III-517-III-520.

Tourapis et al., "Highly Efficient Predictive Zonal Algorithms for Fast Block-Matching Motion Estimation," IEEE Transactions on Circuits and Systems for Video Technology, Oct. 2002, 12(10):934-947.

Tourapis et al., "N-Dimensional Zonal Algorithms. The Future of Block Based Motion Estimation?," 2001 International Conference on Image Processing (Cat. No. 01CH37205), Thessaloniki, Greece, Oct. 7-10, 2001, pp. 506-509.

Wikipedia.org [online], "Synchronous dynamic random-access memory," Dec. 19, 2012, retrieved Sep. 10, 2014, retrieved from URL <https://en.wikipedia.org/w/index.php?title=Synchronous_dynamic_random access_memory&oldid=528801175>, 17 pages.

Zou et al., "An Adaptive Motion Data Storage Reduction Method for Temporal Predictor," Advances in Image and Video Technology: 5th Pacific Rim Symposium, PSIVT 2011, Gwangju, South Korea, Nov. 20-23, 2011, 12 pages.

* cited by examiner

VIDEO CODEC BUFFER QUANTITY REDUCTION

CROSS-REFERENCE TO RELATED APPLICATION

This application is a continuation-in-part of International Application No. PCT/US2023/011851, filed on Jan. 30, 2023, which claims the benefit of U.S. Provisional Application No. 63/305,590, filed Feb. 1, 2022. This application also claims the benefit U.S. Provisional Application No. 63/663,905, filed Jun. 25, 2024. The disclosures of the foregoing applications are incorporated here by reference.

BACKGROUND

The present disclosure relates to techniques for reducing memory usage for video coding and decoding.

Video encoding and decoding systems can exploit spatial, temporal, or both, redundancies in video data to generate a coded representation of video data that has reduced bandwidth as compared to the source video data from which it was generated. These techniques can apply prediction algorithms that predict video content from earlier-coded content, determine differences between the actual video content and its predicted content, and then code residuals representing these differences. In this manner, a video encoding device and a video decoding device can employ algorithms to maintain synchronized representations of prediction data.

The video data can include a sequence of frames that, when combined, create a video. A video encoding or decoding system can process data from the frames, e.g., blocks, as part of the encoding or decoding process. In this way, the video system can more efficiently store the video data by compressing the data than would otherwise be possible by analyzing an entire frame.

SUMMARY

In general, one aspect of the subject matter described in this specification can be embodied in methods that include the actions of determining, from a plurality of prediction modes that can be used to determine historical data for a frame data from a frame in a video sequence, a prediction mode for data that represents the frame data in the frame; in response to determining the prediction mode, selecting, using the prediction mode, one or more buffers from a plurality of buffers, each buffer of which is for a prediction mode from the plurality of prediction modes, a first quantity of buffers in the plurality of buffers being less than a second quantity of prediction modes in the plurality of prediction modes; retrieving, from each of the one or more buffers, historical data for the frame data; and in response to retrieving the historical data, generating, using the historical data, updated data for the frame data in the frame of the video sequence.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

A system can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The operations or actions performed either by the system or by the instructions executed by data processing apparatus can include the methods of any one of the described operations.

The foregoing and other embodiments can each optionally include one or more of the following features, alone or in combination.

In some implementations, the one or more buffers can include a mode agnostic buffer bank that is not specific to any particular prediction mode from the plurality of prediction modes. Selecting the one or more buffers can include selecting an indexed buffer, from the buffer bank, that is for the prediction mode.

In some implementations, the method can include maintaining, in the mode agnostic buffer bank for each prediction mode in a proper subset of prediction modes from the plurality of prediction modes, historical data for the respective prediction mode.

In some implementations, the method can include selecting, using frequencies in which the prediction modes from the plurality of prediction modes occur, the prediction modes in the proper subset of prediction modes.

In some implementations, the historical data can include a motion vector and a reference frame.

In some implementations, selecting the indexed buffer can include: determining whether a reference frame for the frame data satisfies a similarity criterion for a candidate reference frame maintained in the mode agnostic buffer bank; and selecting the indexed buffer that maintains the candidate reference frame in response to determining that the reference frame for the frame data satisfies the similarity criterion for the candidate reference frame maintained in the indexed buffer.

In some implementations, selecting the indexed buffer can include: in response to determining that the reference frame for the frame data satisfies the similarity criterion for the candidate reference frame maintained in the indexed buffer, determining whether the prediction mode for the frame data is the same as a reference prediction mode for the indexed buffer; and selecting the indexed buffer that maintains the candidate reference frame in response to determining that the prediction mode for the frame data is the same as the reference prediction mode for the indexed buffer.

In some implementations, selecting the indexed buffer can include: determining whether the prediction mode for the frame data is the same as a reference prediction mode for the indexed buffer; and selecting the indexed buffer that maintains the reference prediction mode in response to determining that the prediction mode for the frame data is the same as the reference prediction mode for the indexed buffer.

In some implementations, the method can include determining the reference prediction mode for the indexed buffer using a motion vector maintained in the indexed buffer.

In some implementations, the method can include determining, for each candidate reference frame maintained in the mode agnostic buffer bank, whether a reference frame for second frame data satisfies a similarity criterion for the candidate reference frame; determining that the reference frame for the second frame data does not satisfy the similarity criterion for any of the plurality of candidate reference frames maintained in the mode agnostic buffer bank; and in response to determining that the reference frame for the second frame data does not satisfy the similarity criterion for any of the plurality of candidate reference frames maintained in the mode agnostic buffer bank: determining to skip using data from the mode agnostic buffer bank for an encoding or decoding operation for the second frame data; and performing the encoding or decoding operation using the reference frame and the second frame data.

In some implementations, determining the prediction mode can include determining, from the plurality of prediction modes that includes a first prediction mode with mode specific buffer in the plurality of buffers and a second prediction mode without a mode specific buffer in the plurality of buffers, a determined prediction mode for data that represents the frame data in the frame. Selecting the one or more buffers can include selecting, from the plurality of buffers that includes the mode specific buffer and a mode agnostic buffer that is not specific to any particular prediction mode from the plurality of prediction modes, a buffer for the determined prediction mode from the plurality of buffers. Retrieving the historical data for the frame data can include retrieving, from the buffer, second historical data for the determined prediction mode.

In some implementations, selecting the buffer can include selecting the buffer from the plurality of buffers that includes a first mode specific buffer for a single-prediction mode, a second mode specific buffer for a multiple-prediction mode, and the mode agnostic buffer for one or more additional prediction modes.

In some implementations, the one or more additional prediction modes can include a second single-prediction mode and a second multiple-prediction mode.

In some implementations, the first prediction mode might have been assigned a mode specific buffer based at least on a frequency with which the first prediction mode is used to encode frames satisfying a frequency threshold.

In some implementations, the second prediction mode might not have been assigned a mode specific buffer based at least on a second frequency with which the second prediction mode is used to encode frames not satisfying the frequency threshold.

In some implementations, the frequency can be a frequency with which the first prediction mode is used to encode the frames in the video sequence.

In some implementations, determining the prediction mode can include determining, from the plurality of prediction modes that includes at least one single-prediction mode and at least one multiple-prediction mode, a multiple-prediction mode for data that represents the frame data in the frame. Selecting, using the prediction mode, the one or more buffers can include selecting, using the multiple-prediction mode, two or more buffers from the plurality of buffers. Retrieving the historical data for the frame data can include retrieving, from each of the two or more buffers, respective historical data for the frame data. Generating, using the historical data, the updated data for the frame data in the frame of the video sequence can include, in response to retrieving the historical data from each of the two or more buffers, creating, using the historical data from each of the two or more buffers, combined historical data by combining the historical data retrieved from the two or more buffers; and in response to creating the combined historical data, generating, using the combined historical data, the updated data for the frame data in the frame of the video sequence.

In some implementations, determining the prediction mode can include determining, from the plurality of prediction modes that includes two or more single-prediction modes, a first single-prediction mode for data that represents the frame data in the frame. Selecting, using the prediction mode, the one or more buffers can include selecting, using the first single-prediction mode, a buffer for a second single-prediction mode from the plurality of buffers. Retrieving the historical data for the frame data can include retrieving, from the buffer, second historical data for the second single-prediction mode. Generating, using the historical data, the updated data for the frame data in the frame of the video sequence can include, in response to retrieving the second historical data from the buffer, transforming the second historical data for the second single-prediction mode into first historical data for the first single-prediction mode; and in response to transforming the second historical data into the first historical data, generating, using the first historical data, the updated data for the frame data in the frame of the video sequence.

In some implementations, determining the prediction mode for data that represents the frame data in the frame can include determining the prediction mode using parameter data for at least one of the frame data, the frame, or the video sequence. The parameter data can include at least parameters signaled in one of a video parameter set, a sequence parameter set, a picture parameter set, a frame header, a slide header, or a tile header.

In some implementations, selecting, using the prediction mode, the one or more buffers from the plurality of buffers can include selecting, using the prediction mode, one or more buffer banks from a plurality of buffer banks, each buffer bank of which i) is for a prediction mode from the plurality of prediction modes and ii) comprises two or more buffers each of which store respective historical data according to an order. The method can include, after selecting the one or more buffer banks, determining, for each of the one or more buffer banks and using the order, a buffer in the respective buffer bank into which to store second historical data; removing, from each of the one or more buffer banks, stored historical data from the respective buffer; and storing, for each of the one or more buffer banks, the second historical data in the respective buffer.

In some implementations, the method can include generating the second historical data using combined historical data that was created by combining the historical data retrieved from two or more buffer banks. Generating the second historical data can include at least one of splitting, filtering, quantizing, scaling, or transforming the combined historical data. The order can include, for a buffer bank, one of first in-first out, least occurring historical data, or least occurring historical data other than last historical data retrieved from the buffer bank.

In some implementations, determining the prediction mode can include determining, as part of an encoding process for the frame data, the prediction mode for the frame data. Retrieving, from each of the one or more buffers, historical data for the frame data can include retrieving, from each of two or more buffers in the buffer bank, first historical data; creating combined historical data by combining the first historical data from each of the two or more buffers; determining that the combined historical data does not satisfy a similarity threshold for the frame data; in response to determining that the combined historical data does not satisfy the similarity threshold for the frame data, performing one or more operations on the combined historical data to create operated historical data; and retrieving, from a second buffer in the buffer bank, second historical data using the operated historical data. Generating the updated data can include encoding, using the second historical data, the data for the frame data in the frame of the video sequence.

In some implementations, performing the one or more operations on the first historical data can include performing one or more of scaling, filtering, transforming, or quantizing on the first historical data to create the operated historical data. Encoding, using the second historical data, the data for the frame data in the frame of the video sequence can be responsive to determining that the second historical data satisfies the similarity threshold for the frame data.

In some implementations, determining the prediction mode can include determining, as part of an encoding process for the frame data, the prediction mode for the frame data. Retrieving, from each of the one or more buffers, historical data for the frame data can include retrieving, from each of two or more buffers in the buffer bank, first historical data; creating combined historical data by combining the first historical data from each of the two or more buffers; and determining that the combined historical data satisfies a similarity threshold for the frame data. Generating the updated data can include encoding, using the second historical data, the data for the frame data in the frame of the video sequence in response to determining that the combined historical data satisfies the similarity threshold for the frame data.

In some implementations, the historical data can include one of motion vectors, illumination compensation parameters, reference frames, transform types, transform sizes, interpolation filter types, loop filter types, or quantization parameters. Determining the prediction mode can include determining, as part of a decoding process for the frame data, the prediction mode for the frame data. Generating the updated data can include decoding, using the historical data, the data for the frame data in the frame of the video sequence.

In some implementations, determining the prediction mode can include determining, as part of an encoding process for the frame data, the prediction mode for the frame data. Generating the updated data can include encoding, using the historical data, the data for the frame data in the frame of the video sequence. The frame data can include interlace data for the frame.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various embodiments and may result in one or more of the following advantages. In some implementations, the systems and methods described in this specification can reduce an amount of memory used, a number of memory buffers required, or both, compared to other systems by using a smaller quantity of buffer banks than prediction modes. In some implementations, the systems and methods described in this specification can reduce an amount of memory used, a number of buffers required, or both, with minimum quality tradeoff compared to other systems. In some implementations, the systems and methods described in this specification can create new information that can improve the system quality and performance, e.g., by using multi-prediction historical data predictors. In some implementations, the systems and methods described in this specification can result in reduced bandwidth, improved quality, or both, compared to other systems, e.g., by using multi-prediction historical data predictors, because they can help reduce the redundancy of information existing in a video, for example, motion information redundancy. The reduced bandwidth, improved quality, or both, can be beneficial for adaptive streaming and on-demand video applications, and for saving content storage space. In some implementations, the systems and methods described in this specification can result in reduced complexity, faster convergence, higher accuracy, or a combination of two or more of these, when determining the motion parameters in a system that employs motion compensated prediction, such as a video encoder, a motion compensated temporal filtering system, a deinterlacer, or a combination of these.

In some implementations, the systems and methods described in this specification can use fewer computational resources, e.g., memory, compared to other systems. For instance, an amount of memory required to maintain reference motion vectors can be reduced. This can occur while having minimal impact on the overall encoding or decoding process time.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
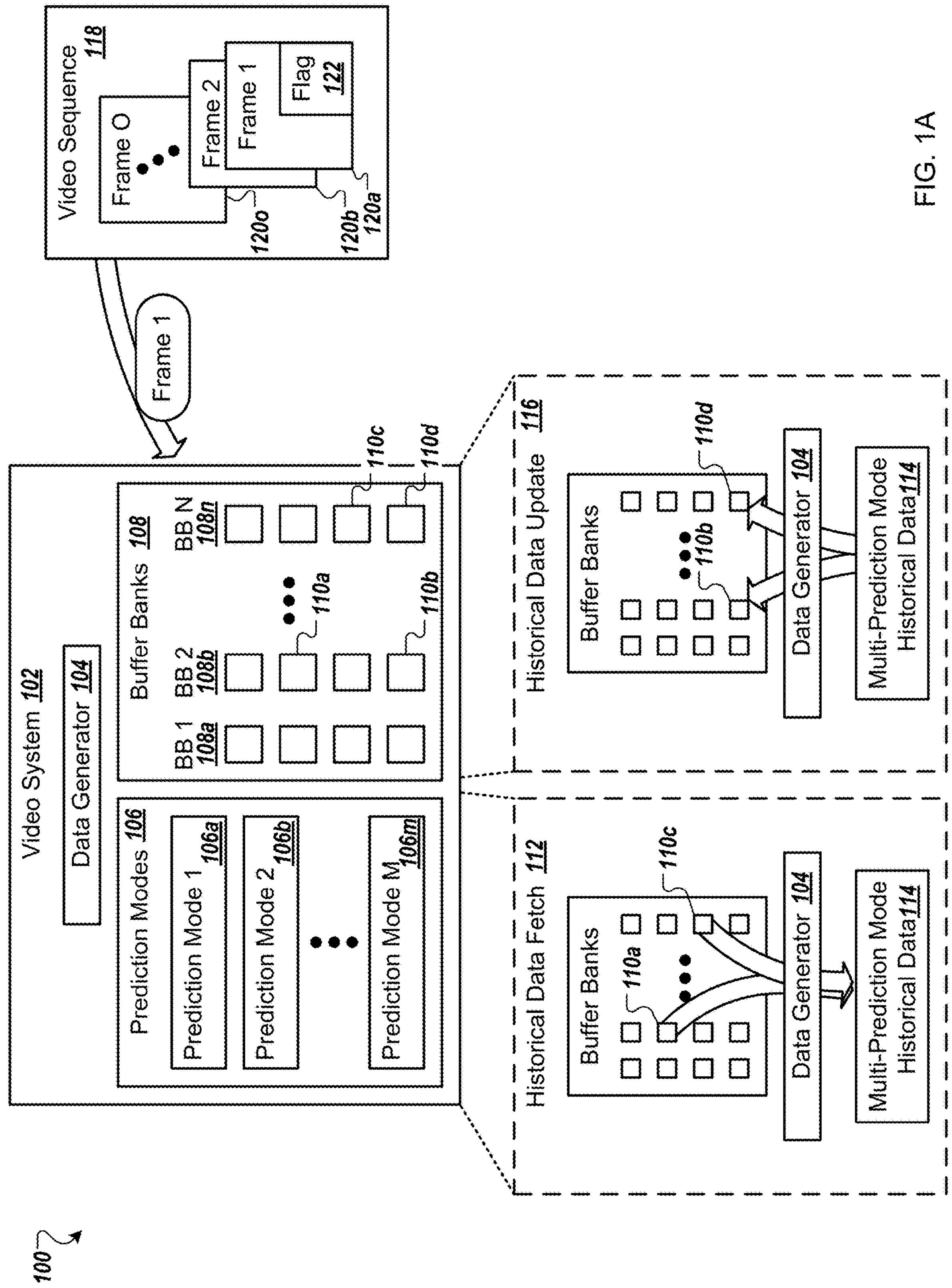
FIGS. 1A-B depict example environments that include a video system that processes data for blocks from frames from a video sequence.

In some video codec designs, coding statistics can be stored in buffers after a frame, coding block, or region is encoded or decoded. For example, such statistics may include information about the prediction modes used, motion information, transform information, coefficients statistics, illumination parameters, reference frame indices, reference picture indices, and so on. The video system can use these statistics to encode or decode future blocks in some specific coding order. To fully exploit these statistics, the video system can classify some statistics based on other statistics. For example, motion information, such as a motion vector, can be stored into different classes that are defined by the prediction modes. Although this can improve coding efficiency, classes defined by prediction modes may use more memory than other processes, which can be costly or problematic for video encoding and decoding systems, e.g., video systems, including applications, hardware implementations, or both.

In some video systems, historical data, e.g., motion information, can be predicted using multiple different candidate vectors, e.g., or multiple-prediction when each vector corresponds to a different prediction mode. Some examples of multiple-prediction can include bi-prediction and compound prediction. The multiple different candidate vectors can include vectors from the immediate spatial neighborhood of an analyzed block, e.g., spatial predictors; from previously coded reference frames, e.g., temporal predictors; from the neighboring video views, e.g., view predictors; from a vector, e.g., motion vector, buffer that is generated during the encoding of the current frame or block; or a combination of two or more of these. Some examples of a motion vector buffer can include a reference motion vector ("ref-mv") bank or spatial buffer predictors.

The video systems can include a separate vector buffer for each of the different modes for multiple-prediction, e.g., multi-hypothesis prediction or compound prediction, and each of the different modes for single-prediction, e.g., uni-prediction. As a result, the number of buffers required by a video system increases as the number of prediction modes, whether single or multiple, increases. The increase in required buffers results in an increase in memory usage for the video system.

A multiple-prediction mode can use two or more of the single-prediction modes together. For instance, multiple-prediction can predict a current block by combining multiple predictions, e.g., two predictions, from different reference frames, different prediction modes, e.g., intra or inter prediction, or both. Single-prediction can use only the prediction from one reference frame or one prediction mode.

To reduce the number of buffers required by a video system, the amount of memory used by the video system, or both, the video system can use a data generator to access fewer motion vector buffers than there are prediction modes to generate historical data, e.g., coding statistics, on the fly. When the video system needs historical data for a block, the video system can determine the prediction mode for the block. When the prediction mode has a corresponding buffer, the video system can retrieve the historical data from the buffer.

The video system can maintain any appropriate number of buffers that is fewer than the number of prediction modes. For example, the video system can maintain dedicated buffers for only single-prediction modes, a mode agnostic buffer bank that is used for the most frequently used prediction modes, whether single- or multiple-prediction modes, or a combination of both. The video system can change the prediction modes for which the mode agnostic buffer bank maintains data, e.g., as the frequencies of different modes changes. In some examples, the video system can maintain one or more dedicated buffers used for the most frequently used prediction modes, whether single-, multiple-, or a combination of both, and a mode agnostic buffer bank that is used for the second most frequently used prediction modes.

When the prediction mode does not have a corresponding buffer, the video system can use the data generator to generate historical data for the prediction mode using data from one or more of the buffers, or determine to skip using historical data, e.g., when the data from the buffers cannot be used to generate the historical data. For example, when historical data for the multiple-prediction mode is not stored in a buffer, the video system can determine which single-prediction modes are the basis of a multiple-prediction mode for the block. The video system can retrieve data from the buffers for the single-prediction modes and provide the retrieved data to the data generator. The data generator can combine the retrieved data to generate historical data for the block.

The video system can then use the generated historical data, or the retrieved historical data if they were stored in the buffer, to encode or decode the block. For instance, the retrieved historical data can indicate a motion vector retrieved from the buffer. As part of an encoding process, the video system can use the motion vector to determine a difference between the motion vector and the block and encode the difference in a generated bit stream for the sequence of frames.

In instances in which the video system does not have a buffer for a mode, or a buffer that can be used to generate historical data for the prediction mode, the video system can perform an encoding or decoding operation without using historical data. For instance, the video system can determine to skip using historical data for the operation and perform the operation as the video system would have otherwise, e.g., as would occur for an initial frame in a video sequence for which there is no historical data.

A prediction mode can include a coding type, e.g., inter or intra; partitioning; uni-prediction or multi-hypothesis prediction; reference indices; motion information; illumination parameters, e.g., if supported; or a combination of two or more of these.

Although the examples described in this specification generally refer to motion vectors, motion vectors are one type of historical data for a block from a frame and other appropriate types of historical data can be used, alone or with motion vectors or vectors. Some other example types of historical data can include illumination compensation parameters, reference frames, transform types, transform sizes, interpolation filter types, loop filter types, or quantization parameters.

Figure 1B:
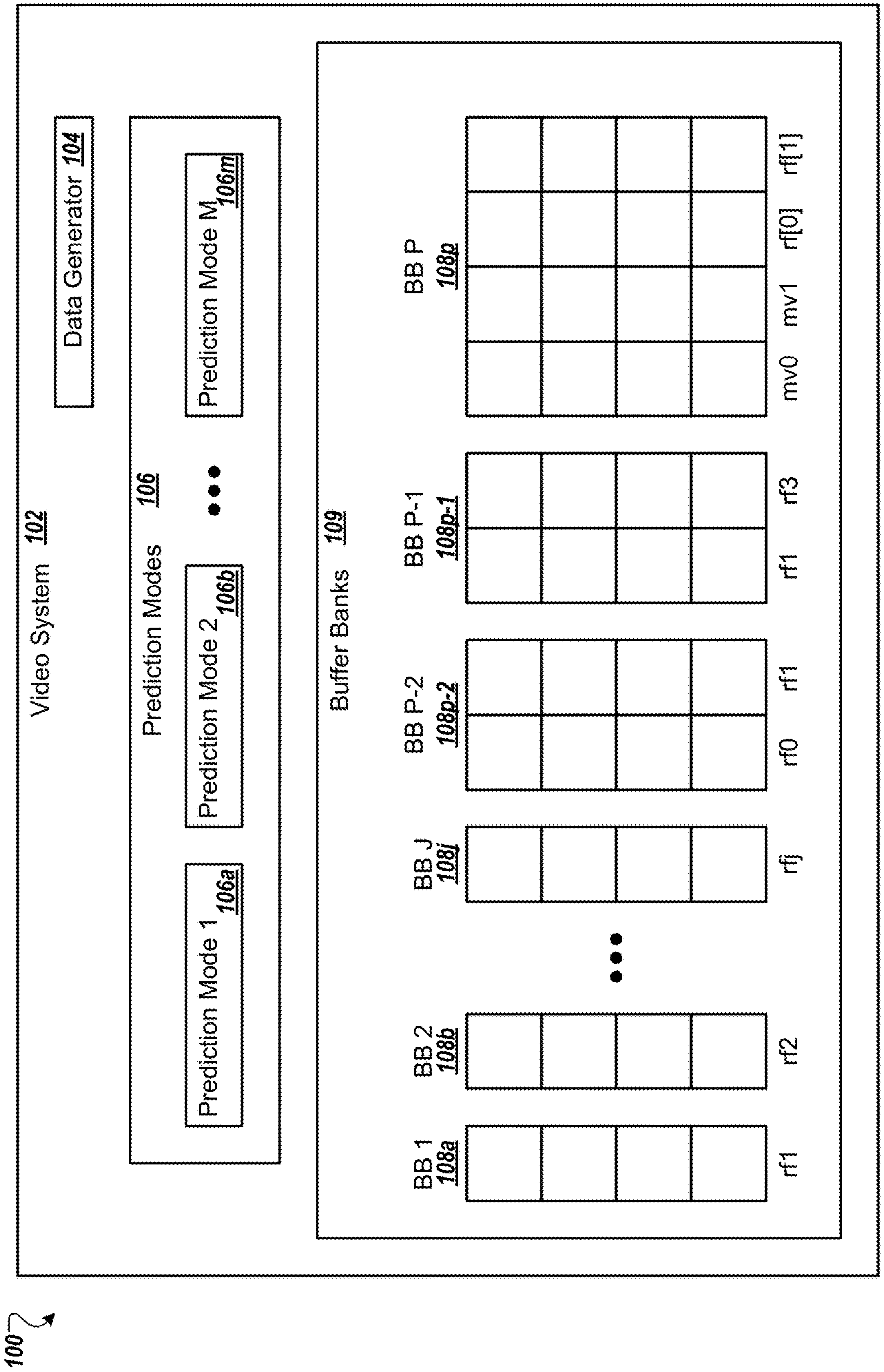

FIGS. 1A-B depict example environments 100 that include a video system 102 that processes data for blocks from frames 120*a-o* from a video sequence 118. The video system 102 can be any appropriate video system, such as an encoder, decoder, or both. For instance, the video system 102 can receive the frames 120*a-o* of the video sequence 118 from a camera and generate a video file from the video sequence 118, e.g., as an encoder.

Since the video system 102 has more prediction modes 106 than buffer banks 108, to reduce a number of the buffer banks 108 and the corresponding memory usage, the video system 102 uses a data generator 104 to determine historical data for the prediction modes 106 for which the video system 102 does not have a dedicated buffer bank 108.

In some systems there are thirty-seven prediction modes for an inter block. Twenty-eight of the prediction modes are for multiple prediction and the remaining seven prediction modes can be for single-prediction. Single-prediction can use only a prediction from one reference frame or one prediction method. Multiple prediction can be a method to predict a current block that combines multiple predictions, e.g. two or more predictions, from different reference frames, or different prediction methods, e.g., intra or inter prediction. When the single-prediction modes include "last", "last2", "last3", "golden", "bwdref", "altref", and "altref2", some example multiple, e.g., compound, prediction modes can include "last-last2", "altref-altref2", "last-altref", and "last2-altref," among others. In some examples, when the single-prediction modes include 'ref0, ref1, ref2, . . . , ref6, intra frame, TIP frame', some multiple-prediction, e.g., compound-prediction, modes can be "refx_refy", in which x,y belongs to [0, 6] and y>=x and refer to the numbering from the corresponding single-prediction modes on which the multiple-prediction mode is based.

When another system includes a buffer bank for each prediction mode, the worst case memory usage can be determined when each super-block, e.g., 128 pixels by 128 pixels, is a tile. In such an example, if the resolution of the video frame that includes the super-blocks that are tiles is A×B, there are A×B/(128×128) tiles in the video frame. Because each tile can be encoded or decoded separately, including in parallel, the other system would need a buffer bank for each tile in the video frame. In some examples, each buffer bank can include four buffers, e.g., such that each buffer can store a motion vector, allowing each buffer bank to store four motion vectors. If each buffer stores sixteen bits, e.g., per motion vector, one buffer would need 2*15 bits, e.g., to allow for motion in both the x and y directions. In the single-prediction mode, there is only one buffer but in multiple prediction there are two or more buffers. For simplicity, this example assumes that there are only two buffers for each multiple prediction mode but the example would scale accordingly for more than two buffers. Based on this, the total memory consumption $M_o$ of the other system, in bits, can be determined using equation (1) below.

$$M_o = (2*15*4*9+2*15*2*4*28)*A*B/(128*128) = 0.4760742*A*B \quad (1)$$

To reduce the amount of memory required to encode, decode, or both, the video sequence 118, the video system 102 stores historical data, e.g., statistics for the encoding process or the decoding process, in a smaller memory buffer that includes the buffer banks 108. When the video system 102 needs historical data for prediction modes 106 that are not stored in the buffer banks 108, the video system 102 can use the data generator 104 and data from the buffer banks 108 to derive the historical data that is not stored in the buffer banks 108, e.g., on the fly.

In the example shown in FIG. 1A, the video system has M prediction modes 106_a-m_ and N buffer banks 108_a-n_. The number of prediction modes M is greater than the number of buffer banks N. For instance, each of the buffer banks 108_a-n_ corresponds to a single-prediction mode 106_a-m_, but there are at least some prediction modes 106_a-m_ for which the video system 102 does not have a dedicated buffer bank 108_a-n_. As a result, the video system 102 can have a first buffer bank 108_a_ for a first prediction mode 106_a_, a second buffer bank 108_b_ for a second prediction mode 106_b_, and an $N^{th}$ buffer bank 108_n_ for a third prediction mode, but not have any buffer banks for additional prediction modes, including an $M^{th}$ prediction mode.

The video system 102 can have buffer banks for a particular type of prediction mode, or for a predetermined set of prediction modes. When the types of prediction modes include single and multiple prediction, the video system 102 can include buffer banks 108 only for the single-prediction modes. In some examples, the video system 102 can include buffer banks 108 for a predetermined set of prediction modes that includes both one or more single-prediction modes and one or more multiple-prediction mode.

The prediction modes 106 for which the video system 102 has buffer banks 108 can be selected using any appropriate process, memory limitations, computational power limitations, or a combination of these. For instance, as the video system 102 reduces the number of prediction modes 106 for which it has buffer banks 108, the video system 102 requires additional computational power for the data generator 104 to generate additional historical data given the historical data stored in the buffer banks 108.

Given the above example of the other system that includes buffer banks for all prediction modes, the video system 102 of FIG. 1A can include buffer banks 108 only for single-prediction modes and not include buffer banks 108 for multiple-prediction modes. As noted above, other instances of the video system 102 can include buffer banks 108 for other combinations of prediction modes.

As a result of the change to the video system 102 compared to the other system, the video system 102 stores historical data, e.g., motion vectors, in a denser way, e.g., using only buffer banks 108 for single-prediction modes. The total memory consumption $M_c$ of the video system 102, in bits, can be determined using equation (2) below.

$$M_c = 2*15*4*9*A*B/(128*128) = 0.0659180*A*B \quad (2)$$

Table 1, below, shows an estimated amount of memory usage for some implementations. In Table 1, the value of K can be determined using equation (3), below. In equation (3), picture_width and picture_height correspond to the width and height of the current frame, respectively. In some instances, K could be 1, 2, 3, or more, depending on the specific application and its requirements.

$$K = (\text{picture\_width} * \text{picture\_height})/(128*128) \quad (3)$$

TABLE 1

| Single-Prediction Mode Memory Usage | |
|---|---|
| The number of independent decoder modules | K |
| Default reference motion vector ("ref-mv") bank size of each mode | 4 |
| Bits of one motion vector ("mv") | 2*15 |
| The number of ref-mv banks for single modes | 9 |
| Total number of bits for ref-mv bank | K*2*15*4*9 = 1,080*K |

In contrast to other systems that include ref-mv banks for compound modes, the memory usage is reduced. For instance, when the other system included 28 multiple-prediction mode ref-mv banks, the other system would require K*2*15*4*(28*2+9)=7,800*K bits.

Although the above example is discussed with reference to seven single-prediction modes and twenty-eight multiple-prediction modes, similar improvements can be provided for other systems with different combinations of single- and multiple-prediction modes. For instance, a system with four single-prediction modes and seventeen multiple-prediction modes can have a similar reduction in memory usage.

To determine historical data for a prediction mode for which the video system 102 does not have a corresponding buffer bank 108, the video system 102 can use a historical data fetch 112, optionally in combination with a historical data update 116. For instance, the video system 102 can receive a video sequence 118, a frame 120*a-o* from the video sequence 118, or some other subset of frames 120*a-o* from the video sequence 118. The video system 102 can then process an individual frame 120*a-o* from the video sequence, such as the first frame 120*a*. This can include processing pixel blocks from the individual frame 120*a-o*.

The video system 102 can use any appropriate process to determine a prediction mode for the frame 120*a*, a block within the frame, or both. For instance, the video system 102 can use data for the video sequence 118, data for the frame 120*a*, data for a block in the frame 120*a*, or a combination of these, to determine the prediction mode. In some examples, the frame 120*a*, the block, or both, can include a flag that identifies a prediction mode from the prediction modes 106 for the video system 102 to use when processing, e.g., encoding or decoding, the frame 120*a*. The flag 122 can be signaled in a video parameter set, a sequence parameter set, a picture parameter set, a frame header, a slice header, a tile header, or in a combination of two or more of these.

The video system 102 can then determine whether the buffer banks 108 include a buffer bank for the prediction mode to use. When the buffer banks 108 include a buffer bank for the prediction mode to use, the video system 102 can use any appropriate process to access the buffer bank for the prediction mode. When the video system 102 accesses a buffer bank for the prediction mode, the video system 102 does not use the data generator 104. For instance, the video system 102 retrieves data from the buffer bank for the prediction mode and processes, e.g., encodes or decodes, the frame 120*a* using the retrieved data.

When the video system 102 determines that the buffer banks 108 do not include a buffer bank for the prediction mode to use, the video system 102 determines to use the data generator 104 to generate historical data for the frame 120*a*, the block, or both. Although this example generally refers to processing an entire frame, a similar process applies to processing other types of video data, such as video data for a block in the frame. The video system 102 can determine which of the buffer banks 108 has data that can be processed to generate historical data for the prediction mode for the frame 120*a*.

For instance, the video system 102 can include buffer banks 108 for only single-prediction modes, e.g., including a "last" buffer bank 108*b* and an "altref" buffer bank 108*n*. The video system can determine that the prediction mode to use is a multiple-prediction mode, such as "last-altref", for which the video system 102 does not have a corresponding buffer bank.

The video system 102 can then use any appropriate process to determine the buffer banks to use to generate historical data for the "last-altref" multiple-prediction mode. For example, the video system 102 can determine that the multiple-prediction mode is a combination of the "last" single-prediction mode and the "altref" single-prediction mode.

As part of the historical data fetch 112 for the frame 120*a*, the video system 102 can retrieve data from the last buffer bank 108*b*, e.g., from a first buffer 110*a*, and retrieve data from the altref buffer bank 108*n*, e.g., from a third buffer 110*c*. The video system 102 can use any appropriate process to determine from which buffer 110*a-d* in a buffer bank 108*a-n* to retrieve data. Some example processes include using a lookup table, majority voting, moment analysis, histogram analysis, etc.

For instance, when using a lookup table, the video system 102 can select buffers in the corresponding buffer banks, e.g., the last buffer bank 108*b* and the altref buffer bank 108*n*, in a specific order, e.g., to maintain coding efficiency. Table 2 below includes one example of sample code to generate a lookup table. In Table 2, the code can exploit the order of the historical data in their original buffers of the corresponding buffer bank to compose a new order in which to store historical data in the buffers 110*a-d* of the corresponding buffer bank. In some examples, the order can maintain a likelihood for the corresponding historical data, e.g., a likelihood that the corresponding historical data appears. This can help the video system 102 predict historical data, e.g., motion information, in current block.

In Table 2, the historical data is a motion vector ("mv"). The buffer bank for the multiple-prediction mode is represented by "ref-mv_bank". The maximum number of motion vectors that each ref-mv_bank buffer can store is indicated by "REF_MV_BANK_SIZE" and the number of motion vectors needed by a compound prediction mode is two. Alternative embodiments that include more prediction modes would use a different value than two.

TABLE 2 sample code

```
uint8_t comp_ref-mv_bank_idx[REF_MV_BANK_SIZE*REF_MV_BANK_SIZE*2];
static INLINE void init_comp_ref-mv_bank_idx(uint8_t *lut) {
  int idx = 0;
  for (int k = 0; k <= 2*(REF_MV_BANK_SIZE-1); ++k) {
    for (int i = 0; i < REF_MV_BANK_SIZE; ++i) {
      for (int j = 0; j < REF_MV_BANK_SIZE; ++j) {
        if ((i + j) == k) {
          lut [idx*2 + 0] = i;
          lut [idx*2 + 1] = j;
          ++idx;
        }
      }
    }
  }
}
examples: REF_MV_BANK_SIZE (number of buffers in the buffer bank) = 4
lut = [
0, 0, // rank 0
0, 1, // rank 1
1, 0, 0, 2, // rank 2
1, 1, 2, 0, 0, 3, // rank 3
1, 2, 2, 1, 3, 0, 1, 3, // rank 4
```

TABLE 2-continued

| sample code |
| --- |
| 2, 2, 3, 1, 2, 3, // rank 5<br>3, 2, 3, 3, // rank 6<br>] |

Continuing the description of the historical data fetch, the video system 102 provides the retrieved data, e.g., from the first buffer 110*a* and the third buffer 110*c*, to the data generator 104. The data generator 104 receives the retrieved data and processes the retrieved data to generate multi-prediction mode historical data 114. The data generator 104 can use any appropriate process or processes to generate the multi-prediction mode historical data 114.

For instance, the data generator 104 can use the, e.g., pre-defined, lookup table ("LUT"), e.g., defined by Table 2, to generate the historical data needed. The generator 104 can fetch the historical data indicated by the entries defined in the LUT, and generates the output data, e.g., the multi-prediction mode historical data 114, using the fetched data.

For instance, the data generator 104 can use expected relationships between the prediction modes that correspond to the retrieved data, e.g., last and altref, and the prediction mode to use when processing the frame 120*a*, or a block within the frame. This can include using expected relationships between i) two or more single-prediction modes and their corresponding reference frames and ii) the multiple-prediction mode and its corresponding reference frame. This can include using expected relationships between i) a first single-prediction mode and its corresponding first reference frame and ii) a second, different single-prediction mode and its corresponding second reference frame. The reference frames for the different prediction modes can be different reference frames, the same reference frame, or a combination of both, e.g., when there are two single-prediction modes and a multiple-prediction reference mode that has a reference frame that is the same as one of the single-prediction modes but different than the other of the single-prediction modes.

In some examples, the data generator 104 can use explicit data that indicates relationships between prediction modes. For instance, the data generator 104 can use relationship data from the video sequence 118, e.g., the bitstream that represents the video sequence 118. The relationship data can be data signaled by a high level syntax layer, e.g., a sequence parameter set, a picture parameter set, a frame header, a slice header, a tile header, or a combination of two or more of these. The relationship data can indicate for which prediction modes historical data can be used to generate the multi-prediction mode historical data 114 for the prediction mode to use.

The video system 102, e.g., an encoder or a decoder, can then use multi-prediction mode historical data 114 to process the frame, the block, or both. For instance, when the multi-prediction mode historical data 114 is a motion vector, the video system 102 can determine a reference frame for the motion vector. The reference frame can be a reference frame for one of the prediction modes that the video system 102 used to generate the multi-prediction mode historical data 114 or another appropriate reference frame. The video system 102 can determine the reference frame using the prediction mode to use, the prediction modes for which historical data was retrieved from the buffer banks 108, or both.

The video system 102, as an encoder, can use the reference frame to determine a difference between the frame 120*a*, or the block in the frame 120*a*, and the reference frame, or a corresponding block in the reference frame. The video system 102 can then store the difference as an encoding for the frame, the block, or both.

After processing the frame, the block, or both, using the multi-prediction mode historical data 114, the video system 102 can perform a historical data update 116. The historical data update 116 can store update data, e.g., statistics, about the processing of the video sequence 118, e.g., the frame or the block, in the buffer banks 108 for later use when processing other portions of the video sequence 118.

The data generator 104 can generate the update data using any appropriate process. For instance, the data generator 104 can use the multi-prediction mode historical data 114 as input to the process to generate the update data. The data generator 104 can split, filter, quantize, scale, transform, or a combination of two or more of these, the data from the multi-prediction mode historical data 114.

The data generator 104 places corresponding update data in the buffer banks from which the video system 102 retrieved historical data. For instance, the data generator 104 can place first update data, e.g., a first motion vector, in a second buffer 110*b* in the last buffer bank 108*b* and second update data, e.g., a second motion vector, in a fourth buffer 110*d* in the altref buffer bank 108*n*.

The data generator 104 can use any appropriate process to determine the buffer in a buffer bank 108 in which to place the update data, the historical data to remove from the buffer bank 108, or both. For instance, the data generator 104 can place data in a buffer bank 108 using a first-in, first out process. In some examples, the data generator 104 can use occurrence statistics to determine where to place the update data in a buffer bank 108, which data to remove from the buffer bank 108, or both. For instance, the data generator 104 can determine, using occurrence statistics, to remove the historical data that is least frequently accessed, or that is least frequently accessed other than the most recently added historical data.

During a decoding process, the video system 102 can use the historical data fetch 112, the historical data update 116, or both, as described above with reference to an encoding process. However, instead of generating the difference data using a reference frame, the video system 102 would use difference data and a reference frame to decode a frame, block, or both, for the video sequence 118. The decoded data could then be used to present at least a portion of the video sequence 118, e.g., that includes the frame 120*a*, on a display.

In some implementations, the video system 102 does not have a buffer bank 108 for every single-prediction mode. In these implementations, the video system 102 can determine that it does not have a buffer bank for a first single-prediction mode but has a buffer bank for a second single-prediction mode. The video system 102 can determine the second single-prediction mode as described above with reference to the multiple-prediction mode example. The video system 102 can then retrieve historical data for the second single-prediction mode and perform one or more scaling, transforming, or both, processes on the historical data to generate first historical data for the first single-prediction mode. The video system 102 can then use the first historical data to process a frame, a block, or both, from a video sequence.

In some implementations, the video system 102 can have one or more buffers that correspond to a prediction mode, e.g., instead of or in addition to having a buffer bank for the prediction mode. In these implementations, the video system 102 can determine, for a first prediction mode for which the video system 102 does not have a corresponding buffer, a second prediction mode. The video system 102 can then select the buffer for the second prediction mode and retrieve data from the buffer for the second prediction mode.

In some implementations, the video system 102 can select a buffer for a prediction mode that the video system 102 will use and for which the video system 102 does not have a corresponding buffer without determining specifically the second prediction mode to which the selected buffer corresponds. For instance, the video system 102 can determine a prediction mode, from multiple prediction modes, that the video system 102 will use to process data for a frame, e.g., a block, and for which the video system 102 does not have a corresponding buffer of historical data, e.g., that does not need to be updated. The video system 102 can select, from multiple buffers and using the prediction mode, a buffer that stores historical data that the video system 102 can update to create updated data for the prediction mode.

In some implementations, the video system 102 can process data retrieved from the buffer banks 108 before generating the multi-prediction mode historical data 114 as part of the historical data fetch 112. For instance, the video system 102, e.g., the data generator 104, can filter out one of more candidates of historical data. When the video system 102 receives four historical data candidates, the video system 102 can determine a similarity measure for the candidates, e.g., that indicates a measure of similarity for the candidate with the other candidates. When the similarity measure does not satisfy a similarity threshold, e.g., the corresponding historical data candidate is more than a threshold amount different than the other candidates, the video system 102 can discard data for the corresponding historical data candidate.

In some examples, the video system 102 can discard data when the similarity threshold indicates that the corresponding candidate is similar to the other candidates. In these examples, the video system 102 can determine that a candidate that has more than a certain amount of similarity does not satisfy the similarity threshold and to discard the candidate.

In some implementations, when the video system 102, e.g., as an encoder, has a buffer bank 108, that includes multiple buffers each of which store respective historical data, the video system 102 can use a similarity threshold to select data for a block. For instance, the video system 102 can select a buffer bank 108 for the prediction mode to use and retrieve data from a first buffer in the buffer bank 108. The video system 102 can determine whether the retrieved data, or a modified version of the retrieved data, satisfies a similarity threshold for the block, e.g., whether the retrieved data is at least the similarity threshold amount similar to the block. The modified version of the retrieved data can be data processed using expected relationships between a first prediction mode to which the retrieved historical data corresponds and the prediction mode the video system 102 will use to process data for the frame 120*a*. If so, the video system can use the retrieved data, or the modified version of the retrieved data, for the prediction mode. If not, the video system 102 can use one or more processes to select another buffer in the buffer bank 108 and determine whether second data retrieved from the other buffer satisfies the similarity threshold.

The historical data processed from the buffer banks 108 can be historical data from different buffers, e.g., when the video system 102 processes multiple sets of historical data to determine that which is most similar to the frame 120*a*, a block from the frame 120*a* that is being processed, or both. The video system 102 can use different processes to determine which data to retrieve from a buffer bank 108, to provide to the data generator 104, or both, using a size of the data from the frame that is being processed. For instance, the video system 102 can use a first process, e.g., keep the most similar historical data, for smaller blocks from the frame 120*a* and use a second, different process, e.g., keep the most dissimilar historical data, for larger blocks from the frame 120*a*. In some examples, the video system can prune the buffer banks 108 from which to retrieve data and then prune historical data candidates, e.g., stored in the buffers 110*a-d*, from the remaining buffer banks 108.

In some implementations, the data generator 104 can process the multi-prediction mode historical data, the update data, or both, before storing the update data in the buffer banks as part of the historical data update 116. For instance, the data generator 104 can filter, quantize, or both, the update data before storing the update data in the buffer banks 108. Since the update data can include data for one or more buffer banks 18, when the update data includes data for two or more of the buffer banks 108, the data generator 104 can separately determine whether to filter, quantize, or both, update data for the separate buffer banks in the two or more buffer banks 108. This can improve the data stored in the buffer banks 108 used during later processing, e.g., remove "noisy" information that may exist when using sub pixel precision motion vectors.

The prediction modes 106 for which the video system 102 maintains buffer banks 108 can be determined using any appropriate process. For instance, the video system 102 can use a predetermined list of the prediction modes 106 for which to maintain buffer banks 108. In some examples, an encoder can place data in the video sequence 118 that indicates the list of prediction modes 106 for which to maintain buffer banks 108. In these examples, a user of the encoder can select the list of prediction modes 106, or the encoder can dynamically select the list of prediction modes 106, e.g., using a type of video, frame, or both, encoded in the video sequence 118. The types of video or frames can include inter frames, still images, e.g., intra-coded frames, fast motion frames, slow motion frames, high texture frames, low texture frames, reference or non-reference frames, high quality or low quality frames, etc. The encoder can place the data that indicates the list of prediction modes in a sequence parameter set, a picture parameter set, a frame header, a slice header, a tile header, or a combination of two or more of these. In some implementations, the encoder and the decoder can maintain a fixed list of prediction modes, e.g., to avoid additional signaling.

FIG. 1B depicts an example of the video system 102 with buffer banks 109 that include a mode agnostic buffer bank 108*p*. The mode agnostic buffer bank 108*p* can include one reference motion vector ("ref-mv") bank list, e.g., a dynamic reference list, with reference frames. For instance, the mode agnostic buffer bank 108*p* can maintain data for all prediction modes. The mode agnostic buffer bank 108*p* can maintain motion vectors, e.g., mv0 and mv1, and reference frames, e.g., rf[0] and rf[1]. The video system 102 can use one or both of the motion vectors or the reference frames to determine whether to select data from the mode agnostic buffer bank 108*p*.

In some examples, the video system 102 can use a reference motion vector when determining whether to select data from the mode agnostic buffer bank 108*p*. The video system 102 can determine a reference frame for the current block, e.g., current coding block. For one or more candidate reference frames maintained in the mode agnostic buffer bank 108*p*, e.g., rf[0] or rf[1] or both, the video system 102 determines whether the candidate reference frame satisfies a similarity criterion, e.g., matches, the reference frame for the current block. If so, the video system 102 can select the corresponding buffer that maintains the candidate reference frame from the mode agnostic buffer bank 108*p*.

If none of the candidate reference frames maintained in the mode agnostic buffer bank 108*p* satisfy the similarity criterion, the video system 102 can determine to perform an encoding or decoding operation for the current frame without using historical data. For instance, the video system 102 can determine to skip using data from the mode agnostic buffer bank 108*p* during the operation for the current frame.

In some implementations, when the reference frame satisfies the similarity criterion for a candidate reference frame, the video system 102 can analyze prediction mode data, e.g., motion vector data, for the current block. For instance, the video system 102 can fetch the motion vectors for the current block. The video system 102 can compare one or more of the fetched motion vectors with motion vector predictor candidates maintained in the mode agnostic buffer bank 108*p*, e.g., in the indexed buffer for the candidate reference frame. When the video system 102 determines that the fetched motion vectors for the current block satisfy a second similarity criterion for one of the motion vector predictor candidates, the video system 102 can use data from the indexed buffer in the mode agnostic buffer bank 108*p* for an encoding or decoding operation. When the video system 102 determines that the fetched motion vectors do not satisfy the second similarity criterion for any of the motion vector predictor candidates, the video system 102 can proceed as described above when the similarity criterion for the reference frame is not satisfied.

The video system 102 can use any appropriate process to insert a new motion vector predictor candidate into the mode agnostic buffer bank 108*p*. For instance, the video system 102 can use pruning to prevent addition of duplicate motion vectors that are already included in the ref-mv bank list maintained by the mode agnostic buffer bank 108*p*. This can increase a likelihood that the list maintains unique motion vector predictor candidates, reduce the likelihood of redundant motion vector information, or a combination of both. By reducing a likelihood of redundant motion vector information, the video system 102 can reduce potential negative impacts to prediction accuracy, coding performance, or a combination of both.

As part of the pruning process, the video system can 102 determine whether the new motion vector satisfies a similarity criterion with a motion vector stored in the mode agnostic buffer bank 108*p*. The similarity criterion can require that one or more components of the motion vector are within a similarity threshold of, e.g., the same as, properties of a maintained motion vector in the mode agnostic buffer bank 108*p*. The components can include the motion vector, a corresponding reference frame, or both.

In some examples, the video system 102 can compare two motion vector predictor candidates as part of the pruning operation. A first one of the candidates can be maintained in the mode agnostic buffer bank 108*p*. A second one of the candidates can be a new motion vector candidate for a recently analyzed frame. The video system 102 can determine whether the two motion vector predictor candidates satisfy the similarity criterion, e.g., whether the two candidates are identical. In some instances, the condition for treating two candidates as identical can be that both motion vectors, both corresponding reference frames, or both of these, are the same. If either one of the components is different, the video system 102 can determine that the two motion vector predictor candidates do not satisfy the similarity criterion, e.g., should not be treated as identical.

Table 3, below, shows an estimated amount of memory usage for some mode agnostic buffer bank implementations. In contrast to the other system described above, e.g., with 7,800*K bits, these implementations that use only a mode agnostic buffer bank 108*p* can have reduced memory usage.

TABLE 3

| Mode Agnostic Buffer Bank Memory Usage | |
|---|---|
| The number of independent decoder modules | K |
| Default reference motion vector ("ref-mv") bank size | 4 |
| Bits of one motion vector ("mv") | 2*15 |
| Bits of one reference frame | 4 |
| Total number of bits for ref-mv bank | K*4*2*(2*15_4) = 272*K |

In some implementations, the video system 102 can use frequency-based buffer banks. In these implementations, the buffer banks 109 can include one or more mode specific buffers 108*a* to 108*p*-1, the mode agnostic buffer bank 108*p*, or a combination of both. The number of prediction modes M is greater than the number of buffer banks P.

The mode specific buffers 108*a* to 108*p*-1 can include single-prediction mode, mode specific buffers 108*a-j*. The single-prediction mode, mode specific buffers 108*a-j* can each maintain a motion vector candidate list, e.g., if available.

The mode specific buffers 108*a* to 108*p*-1 can include multiple-prediction mode, mode specific buffers 108*p*-2 to 108*p*-1. Although FIG. 1B only depicts two multiple-prediction mode, mode specific buffers 108*p*-2 to 108*p*-1, some implementations can include more or fewer multiple-prediction mode, mode specific buffers.

The mode specific buffers maintain data for a corresponding mode throughout an encryption or decryption process. For instance, the video system 102 can assign the most frequently used prediction modes to the mode specific buffers 108*a* to 108*p*-1. This can include assigning the most frequently used modes of the corresponding mode type, e.g., single- or multiple-prediction mode, depending on the number of available buffers.

The video system 102 can, for frequency-based buffer banks, use the mode agnostic buffer bank 108*p* for less frequently used prediction modes. For example, the video system 102 can use the process described above for the mode agnostic buffer bank 108*p*. As shown in FIG. 1B, the video system 102 can determine that the single-prediction modes rf0 to rfj and the multiple-prediction, e.g., compound, modes [rf0, rf1] and [rf1, rf3] are the most frequently used prediction modes and assign these modes their own corresponding mode specific buffer banks 108*a* to 108*p*-1. The video system 102 can use the mode agnostic buffer bank 108*p* for other prediction modes, e.g., to the extent the mode agnostic buffer bank 108*p* has sufficient space for those modes. As a result, the video system 102 can assign the most frequently used prediction modes, that satisfy a first frequency threshold, their own buffer banks, and the second most frequently used prediction modes, e.g., that satisfy a second less restrictive frequency threshold, space in the mode agnostic buffer bank, while not maintaining any data for the prediction modes that don't satisfy either the first or the second frequency thresholds.

When retrieving data for a current block, the video system 102 can determine whether the buffer banks 109 maintain a mode specific buffer bank for the prediction mode. If so, the video system 102 can use data from the corresponding mode specific buffer bank for an encoding or decoding process. If not, the video system can determine whether the mode agnostic buffer bank 108*p* maintains data for the prediction mode, e.g., using the process described above for the mode agnostic buffer bank 108*p*.

When updating the buffer banks 109, the video system 102 can use the prediction mode type to determine an update process. For instance, for the mode specific buffer banks 108*a* to 108*p*-2, the video system 102 can prune new motion vector predictors with existing motion vector predictor candidates in the ref-mv bank that correspond to the reference frame of the current coding frame. For other prediction modes, e.g., all other prediction modes, the video system 102 can prune new motion vector predictors as described above with reference to the mode agnostic buffer bank 108*p*.

Table 4, below, shows an estimated amount of memory usage for some frequency-based buffer bank implementations. In contrast to the other system described above, e.g., with 7,800*K bits, these implementations that use frequency-based buffer banks can have reduced memory usage. In this example, there are six single-prediction mode, mode specific buffer banks and two multiple-prediction mode, mode specific buffer banks.

TABLE 4

Frequency-Based Buffer Bank Memory Usage

| | |
|---|---|
| The number of independent decoder modules | K |
| Default reference motion vector ("ref-mv") bank size | 4 |
| Bits of one motion vector ("mv") | 2*15 |
| Bits of one reference frame | 4 |
| Total bits for ref0 to ref5 single modes | K*4*6*2*15 = 720*K |
| The number of independent decoder modules | K |
| Total bits for [ref0, ref0] and [ref0, ref1] compound modes | K*4*2*(2*15*2) = 480*K |
| Total bits for all other modes | K*4*(2*15 + 4)*2 = 272*K |
| Total number of bits for ref-mv bank | 1,472*K |

For frequency-based buffer banks, the video system 102 determines the modes for the mode specific buffer banks at any appropriate time. For instance, before beginning an encryption or decryption process, the video system 102 determines the modes for the mode specific buffer banks. In some examples, the video system 102 can change one or more of the modes for a mode specific buffer bank during the encryption or decryption process, e.g., when a frequency of the new mode satisfies a third frequency threshold.

The video system 102 can include several different functional components, including the data generator 104, an encoder, a decoder, or a combination of these. The data generator 104, the encoder, the decoder, or a combination of these, can include one or more data processing apparatuses. For instance, each of the data generator, the encoder, and the decoder can include one or more data processors and instructions that cause the one or more data processors to perform the operations discussed herein.

The various functional components of the video system 102 may be installed on one or more computers as separate functional components or as different modules of a same functional component. For example, the data generator 104, the encoder, the decoder, or a combination of these, can be implemented as computer hardware, computer programs, or a combination of both, installed on one or more computers in one or more locations that are coupled to each through a network. In cloud-based systems for example, these components can be implemented by individual computing nodes of a distributed computing system.

Figure 2:
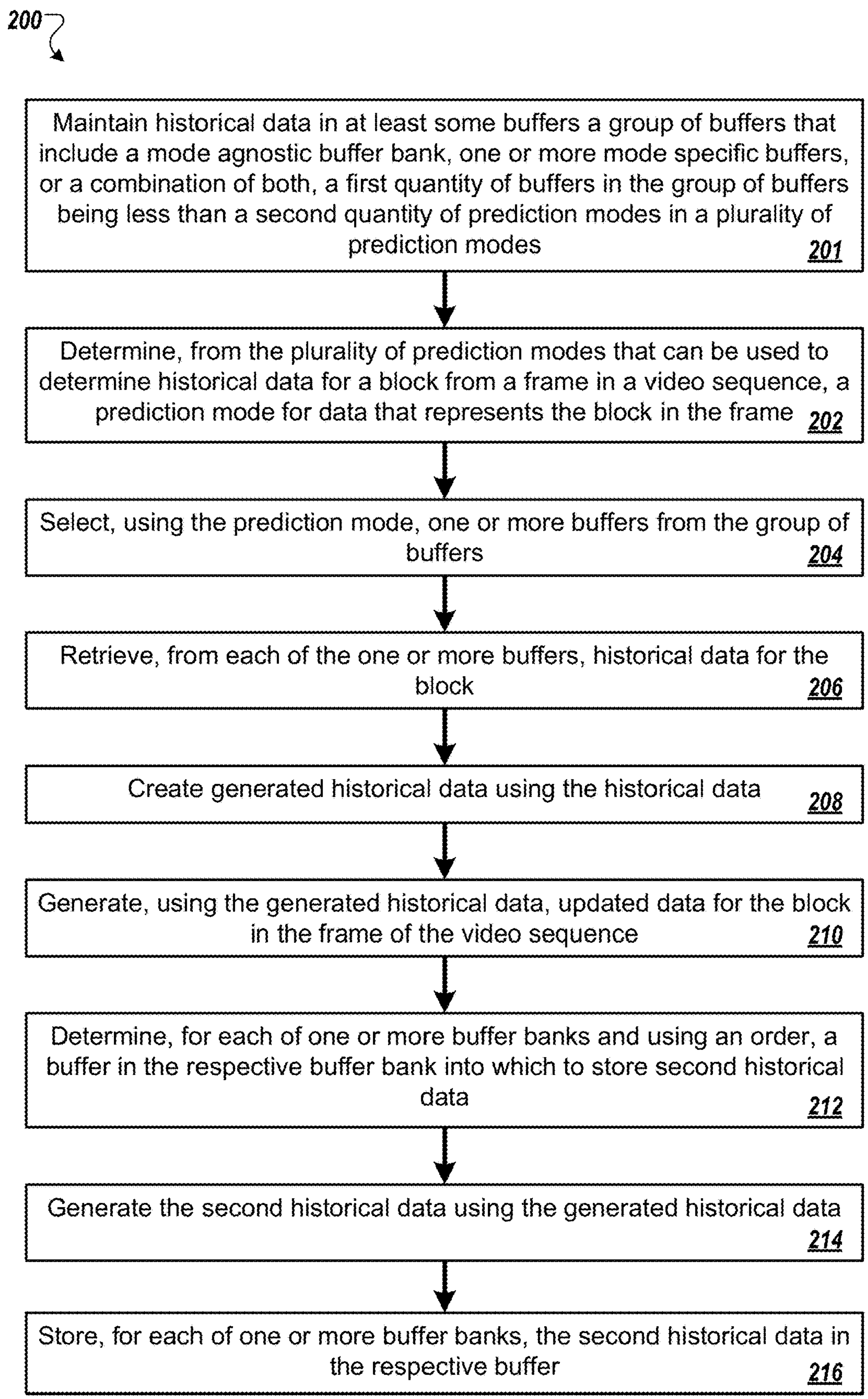
FIG. 2 is a flow diagram of an example process for processing data for a block from a frame of a video sequence.

FIG. 2 is a flow diagram of an example process 200 for processing data for a block from a frame of a video sequence. For example, the process 200 can be used by the video system 102, e.g., a video encoder or a video decoder, from the environment 100.

A video system maintains historical data in at least some buffers from a group of buffers that include a mode agnostic buffer bank, one or more mode specific buffers, or a combination of both (201). For example, the video system can have any appropriate combination of buffers as described in more detail above. A first quantity of buffers in the group of buffers being less than a second quantity of prediction modes in the plurality of prediction modes. The video system can store the historical data in various buffers from the group of buffers while processing data for frames, blocks, or a combination of both, from a video sequence. The processing can be part of an encoding process or a decoding process.

The video system determines, from the plurality of prediction modes that can be used to determine historical data for a block from a frame in a video sequence, a prediction mode for data that represents the block in the frame (202). The video system can determine the prediction mode using data for the block. For instance, the video system can analyze the block and determine the prediction mode. In some examples, the video system can determine configuration data, e.g., a parameter, for the block that indicates the prediction mode. The configuration data, e.g., the parameter, can be for the block, for multiple blocks, for a frame, or for multiple frames in the video sequence.

The video system selects, using the prediction mode, one or more buffers from the group of buffers (204). Each of the mode specific buffers is for a prediction mode from the plurality of prediction modes. The mode agnostic buffer bank is not specific to any particular prediction mode from the group of prediction modes. This can include the video system determining a buffer bank for the prediction mode and selecting a buffer from the determined buffer bank.

In some implementations, the video system can determine whether there is a corresponding buffer for the prediction mode before selecting the one or more buffers. For instance, after determining the prediction mode, the video system can determine whether the prediction mode is a mode for which the video system has a corresponding buffer or buffer bank. In response to determining that the video system has a corresponding buffer or buffer bank, the video system can retrieve historical data from the buffer, e.g., as described with reference to step 206 below. The video system can use the retrieved historical data to generate updated data for the block, e.g., as described with reference to step 210 below.

In response to determining that the video system does not have a corresponding buffer or buffer bank, the video system can select the one or more buffers. The video system can use any appropriate process to select the one or more buffers. For instance, the video system can use a mapping that indicates, for the prediction mode and a set of other prediction modes for which the video system maintains buffers, which other prediction modes should be used to generate historical data for the prediction mode. The video system can select the one or more buffers by determining, using the mapping, the identifiers for the other prediction modes to which the buffers, or buffer banks, correspond.

The video system retrieves, from each of the one or more buffers, historical data for the block (206). For example, the video system can determine addresses for the buffers or buffer banks after selecting the one or more buffers or buffer banks. The video system can use the addresses, whether virtual or actual, to retrieve the historical data.

The video system creates generated historical data using the historical data (208). For example, the video system can process the historical data to create the generated historical data. The processing can include one or more of scaling, filtering, transforming, or quantizing. When the video system accesses data from two or more buffers, the processing can include combining the historical data from each of the two or more buffers.

The video system generates, using the generated historical data, updated data for the block in the frame of the video sequence (210). For instance, during an encoding process, the video system uses the generated historical data, a reference frame, and data for the block, to generate the updated data. The updated data can represent a difference between the reference frame, or a block within the reference frame, and the block. The video system can store the updated data in memory, e.g., in a file that encodes the video sequence.

During a decoding process, the video system can use the generated historical data, a reference frame, and data for the block, e.g., difference data, to generate a representation of the block, e.g., that can be presented on a display as part of a video sequence. The video system can provide the updated data to another device, e.g., to a graphics processing unit, send the updated data to a display unit, or both.

The video system determines, for each of one or more buffer banks and using an order, a buffer in the respective buffer bank into which to store second historical data (212). For instance, the video system can use the order to determine from which buffer in a buffer bank to retrieve data. This can be part of the buffer selection process. When the video system later updates the buffer bank after creating the generated historical data, the video system can use the same order to determine the buffer in the buffer bank into which to store second historical data.

In some implementations, the video system can use a first order to retrieve data from a buffer bank and a second, different order to store data in the buffer bank. For instance, the video system can use a look up table to select a buffer from a buffer bank from which to retrieve data. Using a first-in, first-out process, the video system can select the buffer with the oldest data from the buffer bank as the buffer into which to store the second historical data, and use a method to order and select the data based on other information which is available, e.g., already decoded data.

The video system generates the second historical data using the generated historical data (214). For example, the video system can split, filter, quantize, scale, transform, or a combination of two or more of these, the generated historical data to generate the second historical data. In implementations in which the video system retrieved data from only a single buffer or buffer bank, the video system can filter, scale, or transform the generated historical data to generate the second historical data.

The video system stores, for each of one or more buffer banks, the second historical data in the respective buffer (216). For instance, the video system determines addresses, whether virtual or physical, for the determined buffers in the respective buffer banks. The video system uses the addresses to store the second historical data in the determined buffers.

The order of steps in the process 200 described above is illustrative only, and processing the data for the block from the frame of a video sequence can be performed in different orders. For example, the video system can determine the buffer in which to store second historical data before creating the generated historical data, or before generating the updated data. In some examples, the video system can determine the buffer in which to store the second historical data substantially concurrently with creating the generated historical data, generating the updated data, or both. In some examples, the video system can generate the second historical data and then determine the buffer into which to store the second historical data.

In some implementations, the process 200 can include additional steps, fewer steps, or some of the steps can be divided into multiple steps. For example, the video system can perform steps 202 through 208 without performing the other steps in the process 200. In some implementations, the process 200 can include steps 212 through 216, and optionally step 210, without including the other steps in the process 200. In some examples, the video system can perform steps 204 through 208 without performing the other steps in the process 200.

In some implementations, the video system can use the process 200, or any other processes described in this specification, for data other than a block from the frame. For instance, the video system can process any appropriate type of frame data from the frame, or other data from the video sequence, as part of the process 200. The frame data can include data for a block from the frame, interlace data for the frame, or other appropriate frame data.

In some implementations, the process 200 can include, after selecting the one or more buffer banks, determining, for each of the one or more buffer banks and using the order, a buffer in the respective buffer bank into which to store second historical data (e.g., similar to step 212). The process 200 can include removing, from each of the one or more buffer banks, stored historical data from the respective buffer. The process 200 can include storing, for each of the one or more buffer banks, the second historical data in the respective buffer.

In implementations in which the historical data includes illumination compensation parameters, instead of or in addition to motion vector parameters, the video system can perform scaling, spatial scaling, rotation, or a combination of two or more of these when creating the generated historical data using the retrieved historical data (e.g., as part of step 208. In these implementations, the video system can use the illumination compensation parameters to adjust for brightness in the frame, the block, or both. The video system would then use the illumination compensation parameters, optionally along with a motion vector, to encode the block, decode the block, or both.

In some implementations, the video system, e.g., as an encoder, can estimate motion for a block, a frame, or both, using multi-prediction historical data predictors for a multiple-prediction mode. For instance, when the video system estimates where motion will be in a frame, a block, or both, the video system can use multi-prediction historical data predictors for the multiple-prediction mode with which the video system will encode the frame, the block, or both. This will enable the video system to determine, for a multiple-prediction mode, the two or more buffer banks that have data for the multiple-prediction mode.

The multi-prediction historical data predictors can be the combined historical data created using historical data from each of two or more buffers. Each of the buffers can be in a respective buffer bank. By using multi-prediction historical data, the video system can more accurately, more quickly, or both, determine combined historical data to use when encoding frame data, e.g., a block or a frame, in a bit stream.

The video system can then select one or more buffers from each of the two or more buffer banks. The video system can retrieve historical data from the selected buffers. The video system can combine the historical data retrieved from each of the two or more buffer banks.

The video system can predict the actual data for the block, frame, or both, for which the video system is encoding data using the combined historical data. The video system can determine a distortion, e.g., a similarity measure, between the prediction and the actual data. The video system can use the distortion to determine whether to select another candidate, e.g., another buffer from which to retrieve historical data and perform this process. If the distortion satisfies a distortion, e.g., similarity, threshold, the video system can determine to skip selecting another candidate.

If the distortion does not satisfy the distortion, e.g., similarity, threshold, the video system can select another candidate buffer using the combined historical data. For instance, the video system can split or otherwise extract data from the combined historical data to create two or more historical data sets. The video system can use each of the two or more historical data sets to select another candidate buffer in the corresponding buffer bank from the two or more buffer banks, e.g., and repeat this process. By using multi-prediction historical data predictors, the video system can determine a more accurate candidate, a candidate more quickly, or both, compared to other systems.

In some implementations, the systems and methods described in this specification can be utilized as part of a predictive motion estimation engine that is available in an encoder. The multi-prediction historical data predictors that are utilized by such a scheme can be generated in the manner specified in this specification and examined according to a priority manner that is predefined, automatically determined, or both, based on past coding statistics. A motion estimation engine can use the historical data predictors to examine a distortion criterion, such as the Sum of Absolute Differences. If the predictors satisfy a threshold, e.g., a performance criterion, then the motion estimation engine can terminate the search early and use the best predictor up to the termination as the result of the motion estimation process. If the predictors do not satisfy the threshold, the motion estimation engine can test additional predictors, perform a refinement around the best candidate up to the comparison with the threshold, or both.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., a Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 3:
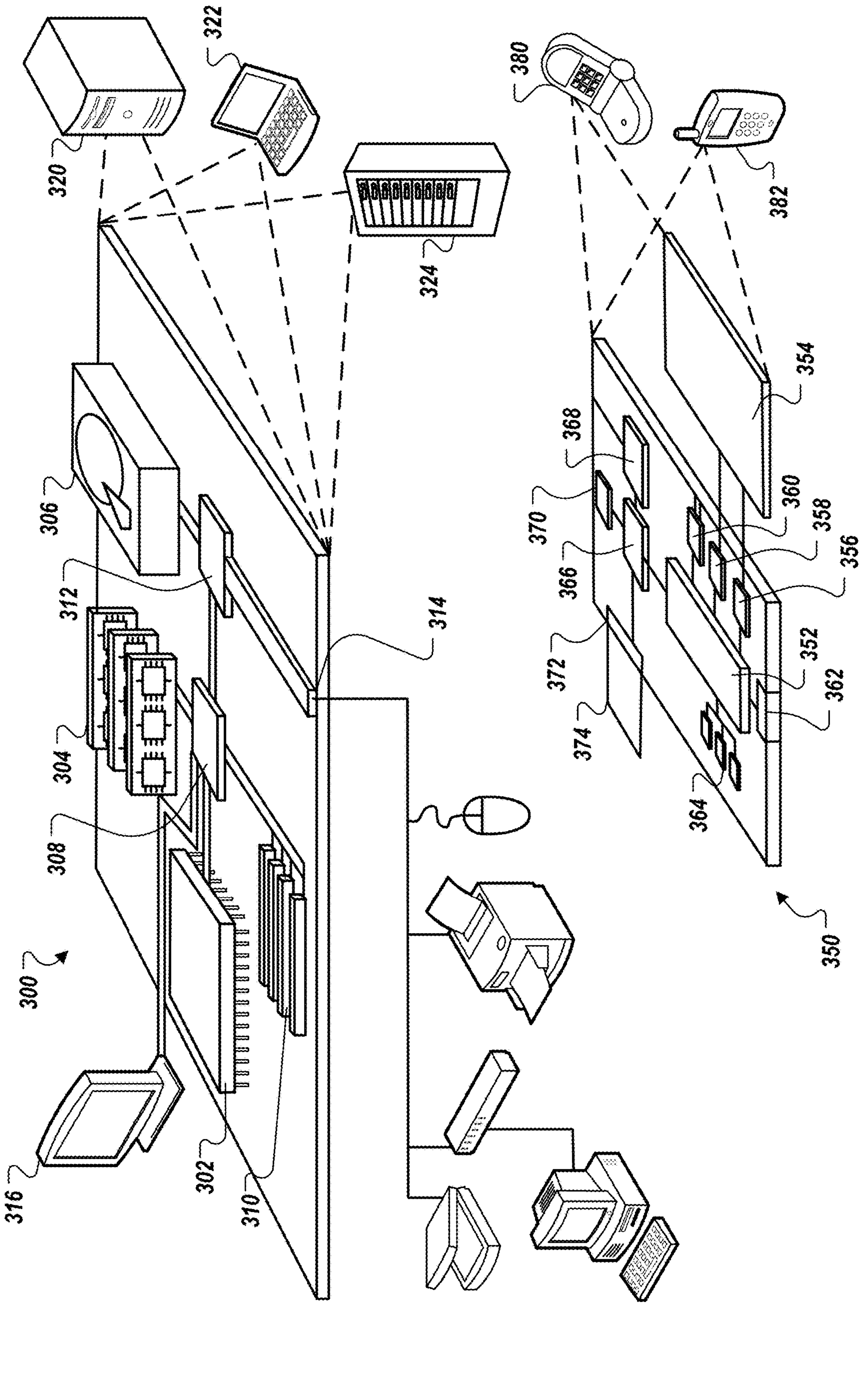
FIG. 3 is a block diagram of a computing system that can be used in connection with computer-implemented methods described in this specification.

FIG. 3 is a block diagram of computing devices 300, 350 that may be used to implement the systems and methods described in this specification, as either a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this specification.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of duties is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication (e.g., via a docking procedure) or for wireless communication (e.g., via Bluetooth or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to device 350 through expansion interface 372, which may include, for example, a SIMM card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS receiver module 370 may provide additional wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method comprising:

maintaining a plurality of buffers each of which is for a corresponding prediction mode from the plurality of prediction modes, wherein:

a first quantity of buffers in the plurality of buffers maintained to be less than a second quantity of prediction modes in the plurality of prediction modes, a first set of prediction modes among the plurality of prediction modes (i) corresponds to the plurality of buffers and (ii) comprises the prediction mode, and a second set of prediction modes among the plurality of prediction modes does not correspond to the plurality of buffers;

determining, from a plurality of prediction modes that can be used to determine historical data for a frame data from a frame in a video sequence, a prediction mode for data that represents the frame data in the frame;

in response to determining the prediction mode, selecting, using the prediction mode, one or more buffers from a plurality of buffers;

retrieving, from each of the one or more buffers, historical data for the frame data; and in response to retrieving the historical data, generating, using the historical data, updated data for the frame data in the frame of the video sequence.

2. The method of claim 1, wherein:

the one or more buffers comprise a mode agnostic buffer bank that is not specific to any particular prediction mode from the plurality of prediction modes; and selecting the one or more buffers comprises selecting an indexed buffer, from the buffer bank, that is for the prediction mode.

3. The method of claim 2, comprising maintaining, in the mode agnostic buffer bank for each prediction mode in a proper subset of prediction modes from the plurality of prediction modes, historical data for a respective prediction mode.

4. The method of claim 3, comprising selecting, using frequencies in which the prediction modes from the plurality of prediction modes occur, the prediction modes in the proper subset of prediction modes.

5. The method of claim 3, wherein the historical data comprises a motion vector and a reference frame.

6. The method of claim 2, wherein selecting the indexed buffer comprises:

determining whether a reference frame for the frame data satisfies a similarity criterion for a candidate reference frame maintained in the mode agnostic buffer bank; and selecting the indexed buffer that maintains the candidate reference frame in response to determining that the reference frame for the frame data satisfies the similarity criterion for the candidate reference frame maintained in the indexed buffer.

7. The method of claim 6, wherein selecting the indexed buffer comprises:

in response to determining that the reference frame for the frame data satisfies the similarity criterion for the candidate reference frame maintained in the indexed buffer, determining whether the prediction mode for the frame data is the same as a reference prediction mode for the indexed buffer; and selecting the indexed buffer that maintains the candidate reference frame in response to determining that the prediction mode for the frame data is the same as the reference prediction mode for the indexed buffer.

8. The method of claim 2, wherein selecting the indexed buffer comprises:

determining whether the prediction mode for the frame data is the same as a reference prediction mode for the indexed buffer; and selecting the indexed buffer that maintains the reference prediction mode in response to determining that the prediction mode for the frame data is the same as the reference prediction mode for the indexed buffer.

9. The method of claim 8, comprising determining the reference prediction mode for the indexed buffer using a motion vector maintained in the indexed buffer.

10. The method of claim 2, comprising:

determining, for each candidate reference frame maintained in the mode agnostic buffer bank, whether a reference frame for second frame data satisfies a similarity criterion for the candidate reference frame;

determining that the reference frame for the second frame data does not satisfy the similarity criterion for any of the plurality of candidate reference frames maintained in the mode agnostic buffer bank; and in response to determining that the reference frame for the second frame data does not satisfy the similarity criterion for any of the plurality of candidate reference frames maintained in the mode agnostic buffer bank:

determining to skip using data from the mode agnostic buffer bank for an encoding or decoding operation for the second frame data; and performing the encoding or decoding operation using the reference frame and the second frame data.

11. The method of claim 1, wherein:

determining the prediction mode comprises determining, from the plurality of prediction modes that includes a first prediction mode with mode specific buffer in the plurality of buffers and a second prediction mode without a mode specific buffer in the plurality of buffers, a determined prediction mode for data that represents the frame data in the frame;

selecting the one or more buffers comprises selecting, from the plurality of buffers that includes the mode specific buffer and a mode agnostic buffer that is not specific to any particular prediction mode from the plurality of prediction modes, a buffer for the determined prediction mode from the plurality of buffers; and retrieving the historical data for the frame data comprises retrieving, from the buffer, second historical data for the determined prediction mode.

12. The method of claim 11, wherein selecting the buffer comprises selecting the buffer from the plurality of buffers that includes a first mode specific buffer for a single-prediction mode, a second mode specific buffer for a multiple-prediction mode, and the mode agnostic buffer for one or more additional prediction modes.

13. The method of claim 12, wherein the one or more additional prediction modes comprise a second single-prediction mode and a second multiple-prediction mode.

14. The method of claim 11, wherein the first prediction mode was assigned a mode specific buffer based at least on a frequency with which the first prediction mode is used to encode frames satisfying a frequency threshold.

15. The method of claim 14, wherein the second prediction mode was not assigned a mode specific buffer based at least on a second frequency with which the second prediction mode is used to encode frames not satisfying the frequency threshold.

16. The method of claim 14, wherein the frequency comprises a frequency with which the first prediction mode is used to encode the frames in the video sequence.

17. The method of claim 1, wherein selecting, using the prediction mode, the one or more buffers from the plurality of buffers comprises selecting, using the prediction mode, one or more buffer banks from a plurality of buffer banks, each buffer bank of which i) is for a prediction mode from the plurality of prediction modes and ii) comprises two or more buffers each of which store respective historical data according to an order.

18. The method of claim 17, comprising:

after selecting the one or more buffer banks, determining, for each of the one or more buffer banks and using the order, a buffer in the respective buffer bank into which to store second historical data;

removing, from each of the one or more buffer banks, stored historical data from the respective buffer; and storing, for each of the one or more buffer banks, the second historical data in the respective buffer.

19. A system comprising one or more computers and one or more storage devices on which are stored instructions that are operable, when executed by the one or more computers, to cause the one or more computers to perform operations comprising:

determining, from a plurality of prediction modes that can be used to determine historical data for a frame data from a frame in a video sequence, a prediction mode for data that represents the frame data in the frame;

in response to determining the prediction mode, selecting, using the prediction mode, one or more buffers from a plurality of buffers, wherein:

each buffer from the plurality of buffers is for a corresponding prediction mode from the plurality of prediction modes, a first quantity of buffers in the plurality of buffers maintained to be less than a second quantity of prediction modes in the plurality of prediction modes, a first set of prediction modes among the plurality of prediction modes (i) corresponds to the plurality of buffers and (ii) comprises the prediction mode, and a second set of prediction modes among the plurality of prediction modes does not correspond to the plurality of buffers;

retrieving, from each of the one or more buffers, historical data for the frame data; and in response to retrieving the historical data, generating, using the historical data, updated data for the frame data in the frame of the video sequence.

20. A non-transitory computer storage medium encoded with instructions that, when executed by one or more computers, cause the one or more computers to perform operations comprising:

determining, from a plurality of prediction modes that can be used to determine historical data for a frame data from a frame in a video sequence, a prediction mode for data that represents the frame data in the frame;

in response to determining the prediction mode, selecting, using the prediction mode, one or more buffers from a plurality of buffers, wherein:

each buffer from the plurality of buffers is for a corresponding prediction mode from the plurality of prediction modes, a first quantity of buffers in the plurality of buffers maintained to be less than a second quantity of prediction modes in the plurality of prediction modes, a first set of prediction modes among the plurality of prediction modes (i) corresponds to the plurality of buffers and (ii) comprises the prediction mode, and a second set of prediction modes among the plurality of prediction modes does not correspond to the plurality of buffers;

retrieving, from each of the one or more buffers, historical data for the frame data; and in response to retrieving the historical data, generating, using the historical data, updated data for the frame data in the frame of the video sequence.

* * * * *